United States Patent

Sawada et al.

[11] Patent Number: 5,912,992
[45] Date of Patent: Jun. 15, 1999

[54] BINARY IMAGE FORMING DEVICE WITH SHADING CORRECTION MEANS USING INTERPOLATION OF SHADE DENSITIES DETERMINED BY USING SAMPLE POINTS

[75] Inventors: Yuji Sawada, Chiba; Mitsuaki Nakamura, Yamatokooriyama; Hisashi Saiga, Chiba; Yoshihiro Kitamura, Osaka, all of Japan

[73] Assignee: Sharp Kabushiki Kaisha, Osaka, Japan

[21] Appl. No.: 08/828,285

[22] Filed: Mar. 21, 1997

[30] Foreign Application Priority Data

Mar. 26, 1996 [JP] Japan ................................. 8-069757

[51] Int. Cl.$^6$ .................................................... G06K 9/40
[52] U.S. Cl. .......................................... 382/274; 358/461
[58] Field of Search ........................... 382/274; 358/461; 348/251

[56] References Cited

U.S. PATENT DOCUMENTS

| 4,163,257 | 7/1979 | White ..................................... 358/133 |
| 4,977,605 | 12/1990 | Fardeau et al. . |
| 5,621,824 | 4/1997 | Ijiri et al. .................................. 382/274 |

FOREIGN PATENT DOCUMENTS

| 0 113 016 A2 | 7/1984 | European Pat. Off. . |
| 0 578 875 A1 | 1/1994 | European Pat. Off. . |
| 2-206894 | 8/1990 | Japan . |
| 3-79158 | 4/1991 | Japan . |
| 6-131492 | 5/1994 | Japan . |
| 6-301775 | 10/1994 | Japan . |
| 8-241375 | 9/1996 | Japan . |

Primary Examiner—David K. Moore
Assistant Examiner—Chad Billings
Attorney, Agent, or Firm—Nixon & Vanderhye, P.C.

[57] ABSTRACT

It is possible to clearly extract objects such as characters and line figures by eliminating the effect of shading from an input image containing self-shaded objects and/or vaguely contoured objects together with distinctly contoured object and thereby to extract all objects clearly and completely. A sample point setting portion sets sample points, a sample point shade calculating portion determines an optical density of shading at each sample point according to an optical density distribution of pixels in a reference block including the sample point at the center thereof. A shade calculating portion determines shade densities at the other points than the sample points and generates shade image, a shade removing portion generates a shade-removed image by removing the shading effect from the input image by using the shade image. A quantizing portion binarizes the shade-removed image and an image output portion outputs the obtained binary image.

3 Claims, 10 Drawing Sheets

INPUT IMAGE

SHADE IMAGE

SHADE-REMOVED (SHADELESS) IMAGE

WITHOUT CORRECTION OF DENSITY

BINARIZATION ACCORDING TO THE PRESENT INVENTION

30: SAMPLE POINT
40: REFERENCE BLOCK
50: EDGE

● INITIAL SAMPLE POINT
○ ADDITIONAL SAMPLE POINT

BINARY IMAGE FORMING DEVICE WITH SHADING CORRECTION MEANS USING INTERPOLATION OF SHADE DENSITIES DETERMINED BY USING SAMPLE POINTS

BACKGROUND OF THE INVENTION

The present invention relates to a binary image forming device which is capable of extracting objects such as characters and lines with no influence of shading by previously removing shade (partial darkness) from a shade-containing image.

RELATED ART

A conventional representative method of forming a binary image prepares first an optical density histogram indicating a correlation between density values and the number of their occurrences (frequency values), calculates a binalizing threshold by a method such as discriminant analysis and quantizes an image into a set of binary coded signals according to the threshold value. Since this method binalizes all pixels within an image according to the same threshold, it is effective for binalizing an image whose background has an even optical density but can not obtain a suitable threshold for binalizing an image having an uneven background density caused by shading or like partial darkness.

Conventional countermeasures to solve the above-mentioned problems are as follows:

(1) Japanese Laid-Open Patent Publication No. 3-79158 proposes a method for finding and eliminating shading caused by rising a binding margin portion of a book-like original from the glass of a digital copying machine.

(2) Japanese Laid-Open Patent Publication No. 6-301775 proposes a method for binarizing an input image containing lines mixed with shading by determining a dispersion of optical densities of the specified number of neighboring pixels within an input image and then quantizing the obtained dispersed values representing the input image.

However, the method disclosed in Japanese Laid-Open Patent Publication No. 3-79158 encounters a problem in that removing shade is accompanied by erasing self-shaded objects.

In the method disclosed in Japanese Laid-Open Patent Publication No. 6-301775, the binary quantization of an image into dispersed density values fails to extract objects having diffused contours (boundaries) if such objects coexist with objects having distinct contours.

Concerning an image whose background has an optical density value being larger (brighter) than that of any object (character or line) to be extracted, the density value of the object is certainly smaller (darker) than that of the neighborhood background independent of the boundary condition of the object and shading thereon. On the contrary, an image whose background has an optical density value being smaller (darker) than that of an object to be extracted, the density value of the object is certainly smaller (brighter) than that of the neighborhood background independent of the boundary condition of the object and shading thereon.

SUMMARY OF THE INVENTION

On the basis of the above-mentioned density relationship existing between an object and its neighboring background, it is an object of the present invention to provide a binary image forming device which is capable of generating a desirable binary image by eliminating the effect of shading from an input image by calculating a background density, determining shading of the image and then extracting objects (characters and lines) only and entirely, i.e., without erasing any object even if the objects are shaded or vaguely contoured objects and coexists with distinctly contoured objects in the image.

It is another object of the present invention to provide a binary image forming device which is capable of generating a desirable binary image by eliminating the effect of shading from an input image without erasing any object even if the latter being self-shaded. It can extract any vaguely contoured object even if such object exists among distinctly contoured objects.

When working with an input image containing unknown size of extractive objects (e.g., characters or line figures), the binary image forming device can not assure that all reference blocks for all sample points contain their background areas.

It is another object of the present invention to provide a binary image forming device which assures that each reference block certainly contains a background area for a corresponding sample point, thereby it can generate a more accurate shading image and finally obtain a more desirable binary image.

It is another object of the present invention to provide a binary image forming device even if a large distance between sample points must be set because sizes of extractive objects can not correctly be recognized, which can produce a more accurate shading image by determining the shading with an increased number of suitable sample points to finally obtain an accurate and desirable binary image.

PREFERRED EMBODIMENTS OF THE INVENTION

Figure 1:
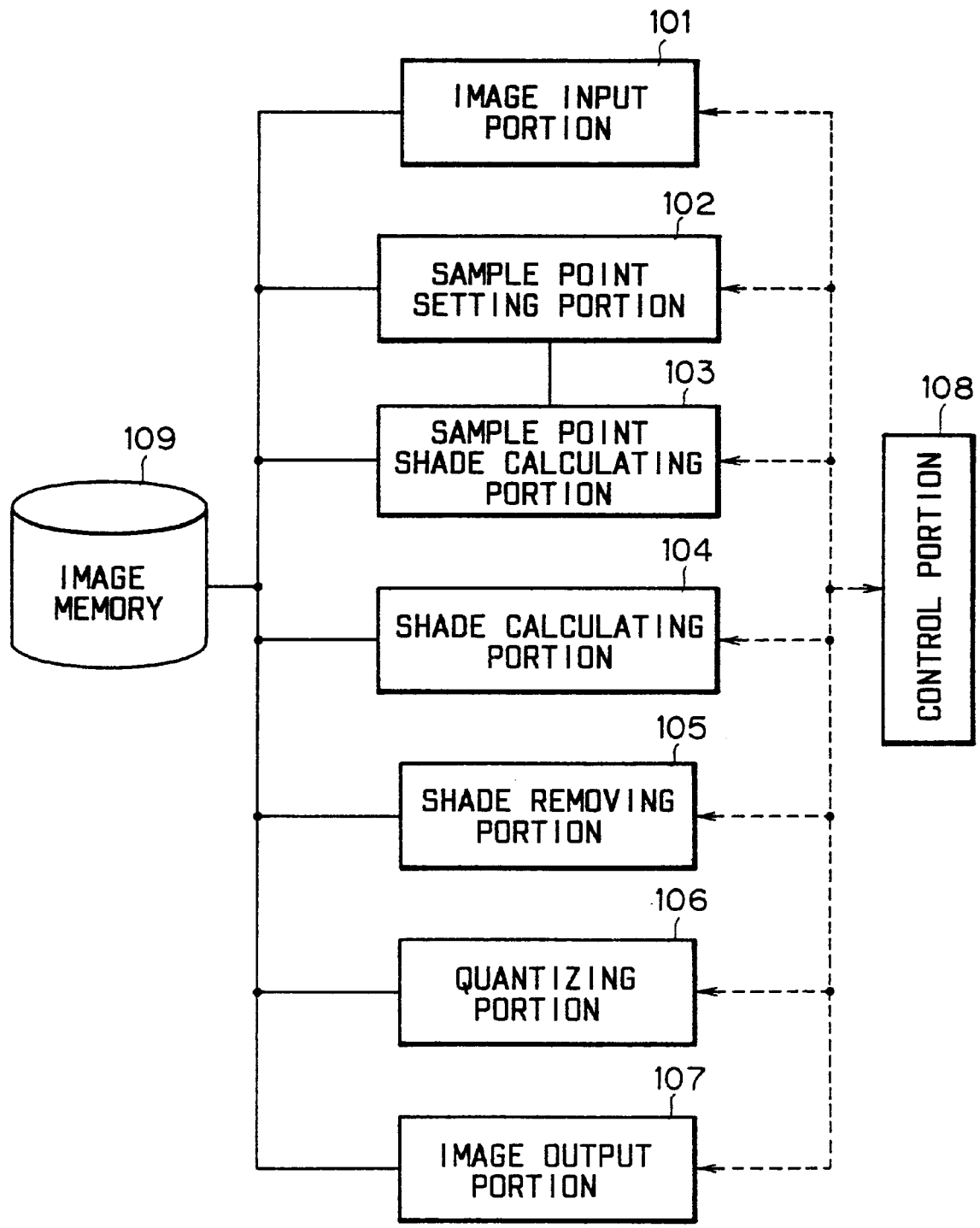
FIG. 1 is a block diagram showing a construction of a binary image forming device which is a first embodiment of the present invention.

FIG. 1 is a block diagram of a binary image forming device according to a first embodiment of the present invention. In FIG. 1, the binary image forming device comprises an image input portion 101 (e.g., a charge-coupled camera) for inputting an image to be converted into a binary image, a sample point setting portion 102 for setting sample points 30 one for a specified number of pixels composing the input image; a sample-point shade calculating portion 103 for setting a reference block of specifided size for each sample point located at a center thereof and determining an optical density of shading at each sample point from a density distribution of pixels in each reference block; a shade calculating portion 104 for generating a shading image by interpolating calculation of shade densities of the other pixels than the sample points on the basis of sample-point shading densities determined at respective sample points; a shade removing portion 105 for generating a shadeless image by removing the effect of shading according to the shade image generated by the shade calculating portion 104; a quantizing portion 106 for producing a set of binarized data representing the determined shadeless image; an image output portion 107 for displaying or printing the binary image obtained by the quantizing portion 106; a control portion 108 for controlling the portions 101–107; and an image memory 109 for storing images generated by the respective processing portions.

Figure 2:
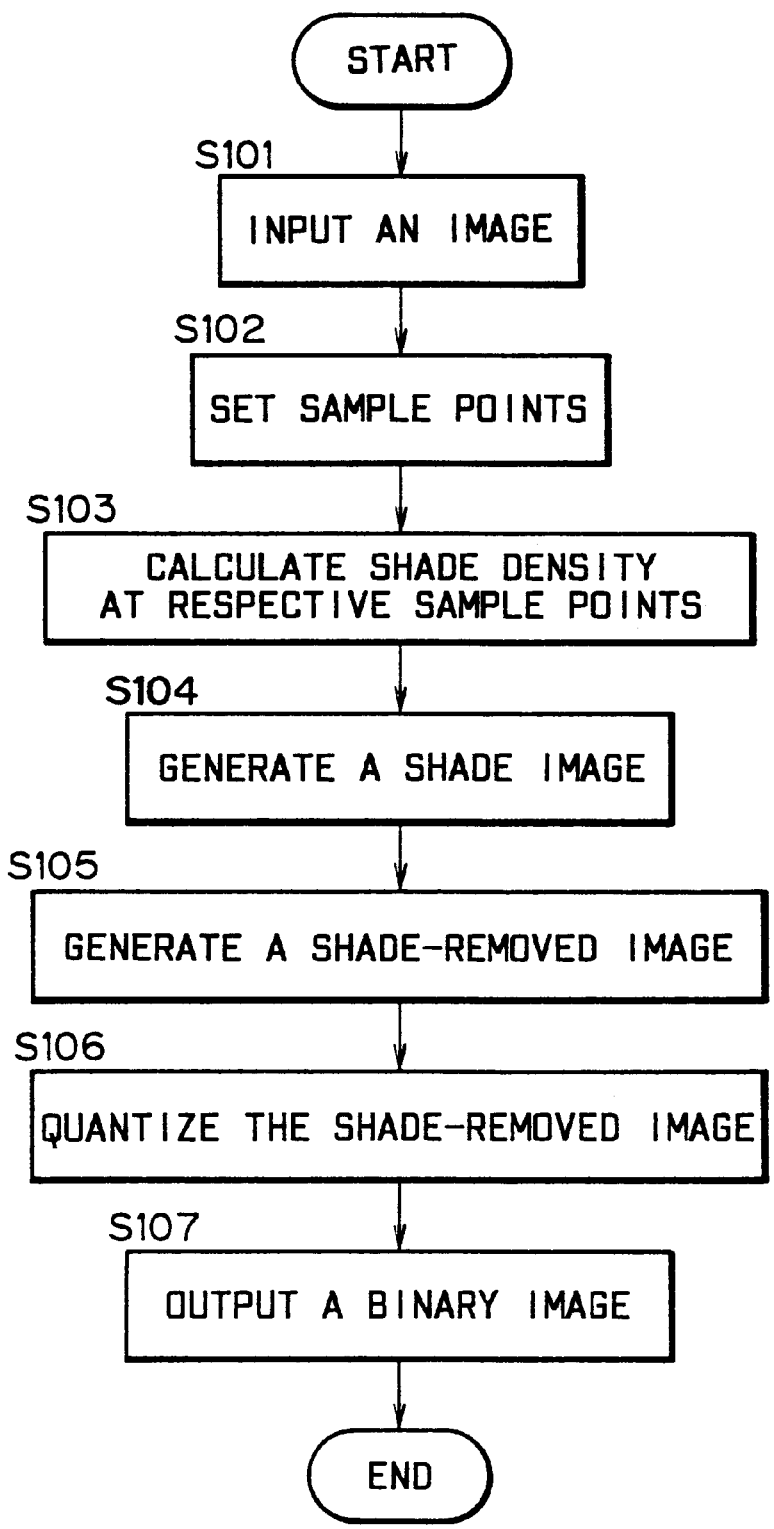
FIG. 2 is a flow chart for explaining operations of the first embodiment of the present invention.
Figure 5A:
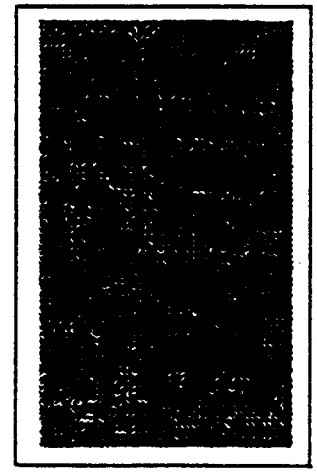
FIG. 5A to FIG. 5E are views for explaining an example of application of the present invention to processing an image of an automobile's license plate.

Referring to a flow chart of FIG. 2, the operation of the above-mentioned binary image forming device (the first embodiment) will be described below. To simplify the explanation, the device is supposed to work with an input image where an optical density of a background (i.e., all other portions than extractive objects) is larger (brighter) than an optical density of the objects to be extracted. A reverse case may be understood by reversing the density values of the object and the background. By way of example, an image of a license plate for an automobile, which is shown in FIG. 5A, will be quantized by the embodiment.

An input image to be binarized is inputted through the image input portion 101 such as a charge-coupled camera (CCD) (Step S101). Characters in this input image contain shading as shown in FIG. 5A. A background in the input image includes all the other portions than extractive objects i.e., two Japanese characters accompanied by numerals 33, and numerals 94-00.

Figure 3:
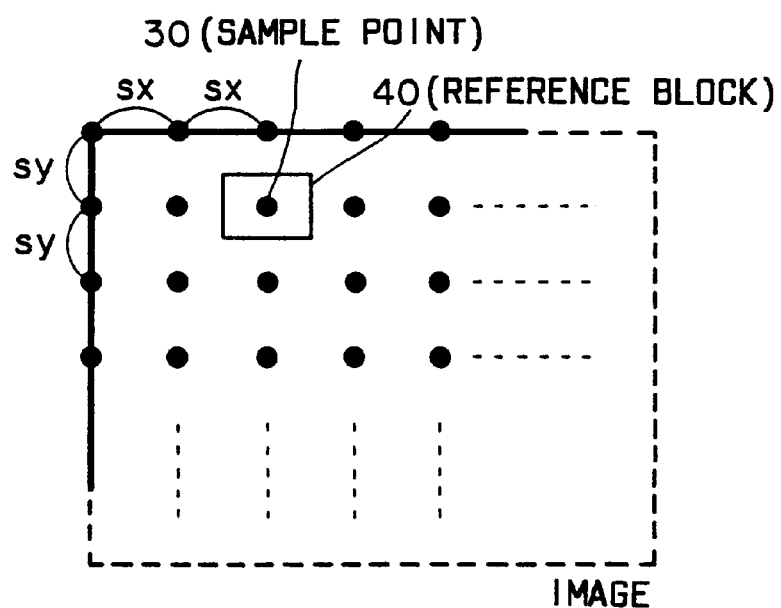
FIG. 3 is a view for explaining how to set a sample point and a reference block in the first embodiment of the present invention.

The sample point setting portion 102 sets sample points 30 one for a certain number of pixels as shown in FIG. 3 (Step S102). A horizontal distance sx and a vertical distance sy between sample points are set to a smallest possible value on the condition that a rectangle of sx by sy in size, which is extracted from any portion of the input image, must contain a background. When sizes of extractive characters (e.g., numbers on a license plate) can be defined from a whole frame size (plate size), the width of each character is preset to a value presumable from the whole frame size. If any extractive object can not correctly be defined in size, the sample point setting portion 102 requests a user to enter its size value through an interface therewith or it sets a value larger than a presumed size.

The sample-point shade calculating portion 103 determines an optical shade density at each sample point 30 set by the sample-point setting portion 102 (Step S103). A rectangle of sx by sy in size is set as a reference block 40 in such a way that a sample point 30 is located at a center of the rectangle. However, a reference block 40 for a sample point 30 existing at an edge portion of an image may be partially out of the image and, in this case, its part remaining within the image is considered to be effective. The sample-point shade calculating portion 103 performs following operations on each sample point 30:

I. It determines optical densities of pixels within the reference block 40 and prepares a histogram indicating a relationship between the determined optical density values and the number of the occurrences of the values;

II. It adds the frequency values of the histogram one by one in the ascending order of optical density values and determines an optical density value $t_{upper}$ at which a sum of the frequency values corresponds to $p_{back}\%$ of the total number of pixels; and III. It determines a mean optical density value $t_{back}$ of pixels each having an optical density value not smaller than $t_{upper}$.

The mean optical density value $t_{back}$ obtained by step III is taken as an optical density of shading at the sample point 30. This is based upon the fact that the optical density of background pixels is larger than that of any objective pixel within a limited area independent of whether shading exists or is absent thereat. As the rectangular reference block 40 always contains a background area, it enables effective determination of an optical density of the background at any sample point even if the later exists within an area of an objective character or a line figure.

Figure 5B:
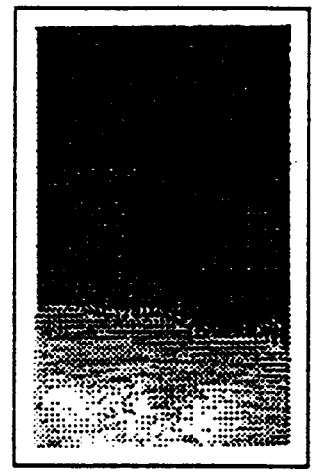

The shade calculating portion 104 determines the shade density of the other pixels except the sample point 30 by an interpolating method and generates a shade image (Step S104). FIG. 5B shows a shade image generated from an input image shown in FIG. 5A.

An example of calculation of the shade density by linear interpolating method will be described below, though the density can be also interpolated by a curved surface interpolation by using a B-spline surface or a Bezier's curved surface.

Figure 4:
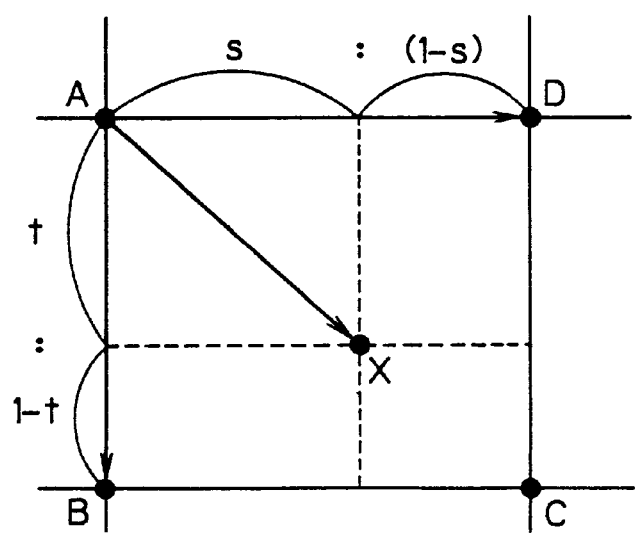
FIG. 4 shows a locational relation between a pixel (X) and neighboring sample points (A, B, C, D) when calculating for interpolation of shades at other points other than the sample points in the first embodiment of the present invention.

A shade density of an optional pixel X except sample points is determined by linear interpolation from shade density values of sample points A, B, C and D, which are neighboring each other to surround the pixel X as shown in FIG. 4.

In FIG. 4, a vector AX has the following relation with vectors AD and AB:

$$\overrightarrow{AX}=s * \overrightarrow{AD}+t * \overrightarrow{AB} (0\leq s\leq 1, 0\leq t\leq 1) \quad (1)$$

Accordingly, an optical density value I(X) of the pixel X can be determined by the following equation:

$$I(X)=(1-t) * \{(1-s) * I(A)+s * I(D)\}+t * \{(1-s) * I(B)+s * I(C)\} \quad (2)$$

In Equation (2), I(A), I(B), I(C) and I(D) designate shade density values at sample points A, B, C and D respectively. This processing is carried out on all pixels except sample points to produce a shade image (Step S104).

The shade removing portion 105 transforms the optical density of the input image according to the optical density of the shade image prepared by the shade calculating portion 104 and generates a shade-removed image (Step S105). Namely, the input image shown in FIG. 5A has removed therefrom the effect of the shade image of FIG. 5B to produce a shadeless image shown in FIG. 5C.

Image data R (x, y) of the shadeless image is determined by the following expression, where I (x, y) is input image data and G(x, y) is shade image data.

$$R(x, y) = L \times \frac{I(x, y)}{G(x, y)} \qquad (3)$$

Figure 5C:
Figure 5D:

The Image data R(x, y) is obtained by conducting the above-mentioned calculation for each of pixels within the image. If G(x, y) accurately represents a shade of a background, optical densities I(x, y) of a background are converted all to L as shown in Expression (3). Consequently, a shadeless image with a background of an even optical density is produced as seen in FIG. 5C. L is a constant that must be set at an adequate value securing that R(x, y) may falls within a certain range of optical density levels (e.g., 0–255 for a 256-level gradation image).

Figure 5E:

Finally, the quantizing portion 106 conducts binarizing processing on the shadeless image produced by the shade removing portion 105 by a simple method e.g., discriminant analysis (Step S106). A binary image shown in FIG. 5E is obtained from the shade-removed image of FIG. 5C.

The obtained binary image is outputted by the image output portion 107 (Step S107). The image processing is completed at this step. The output image from the image output portion 107 may be displayed on a display or printed by a printer.

FIG. 5A to FIG. 5E show an image of a license plate of an automobile, including an input image (FIG. 5A), a shade image (FIG. 5B) produced at Step S104, a shade-removed (shadeless) image (FIG. 5C) produced at Step S105 and a binary image (FIG. 5E) obtained by quantizing the shadeless image (FIG. 5C) by the discriminant analysis method.

According to the above-mentioned method, it is possible to produce a binary image from an input image containing extractive objects (e.g., character, line and so on) shaded by themselves or having vague countours by eliminating the effect of shading therefrom without erasing any object and effectively extracting all objects.

Figure 6:
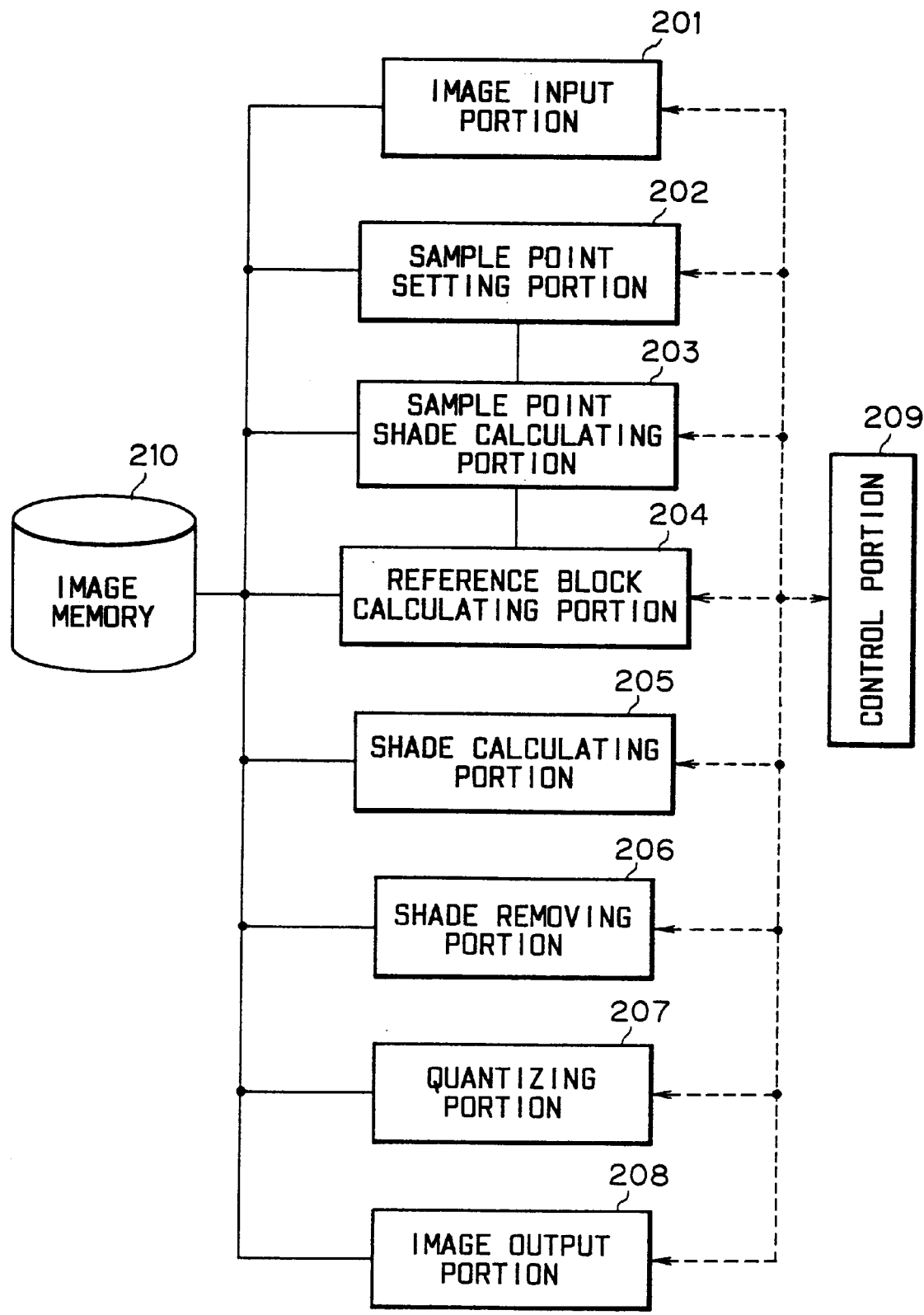
FIG. 6 is a block diagram showing a construction of a binary image forming device which is the second embodiment of the present invention.

FIG. 6 is a block diagram of a binary image forming device according to a second embodiment of the present invention. In FIG. 6, the binary image forming device comprises: an image input portion 201 (e.g., a charge-coupled camera) for inputting an image to be converted into a binary image; a sample point setting portion 202 for setting sample points 30 one for a certain number of pixels composing the input image; a reference block calculating portion 204 for setting a reference block 40 adaptable for calculating shading for each sample point; a sample-point shade calculating portion 203 for determining a shade density at each sample point from a density distribution of pixels in the reference block set by the reference block calculating portion 204; a shade calculating portion 205 for generating a shade image by interpolating calculation of shade densities of pixels except the sample points on the basis of sample-point shading densities determined at respective sample points; a shade removing portion 206 for generating a shadeless image by removing the effect of shading according to the shade image generated by the shade determining portion 205; a quantizing portion 207 for producing a set of binarized data representing the determined shadeless image produced by the shade removing portion 206; an image output portion 208 for displaying or printing the binary image obtained by the quantizing portion 207; a control portion 209 for controlling the portions 201–208; and an image memory 210 for storing images generated by the respective processing portions.

Figure 7:
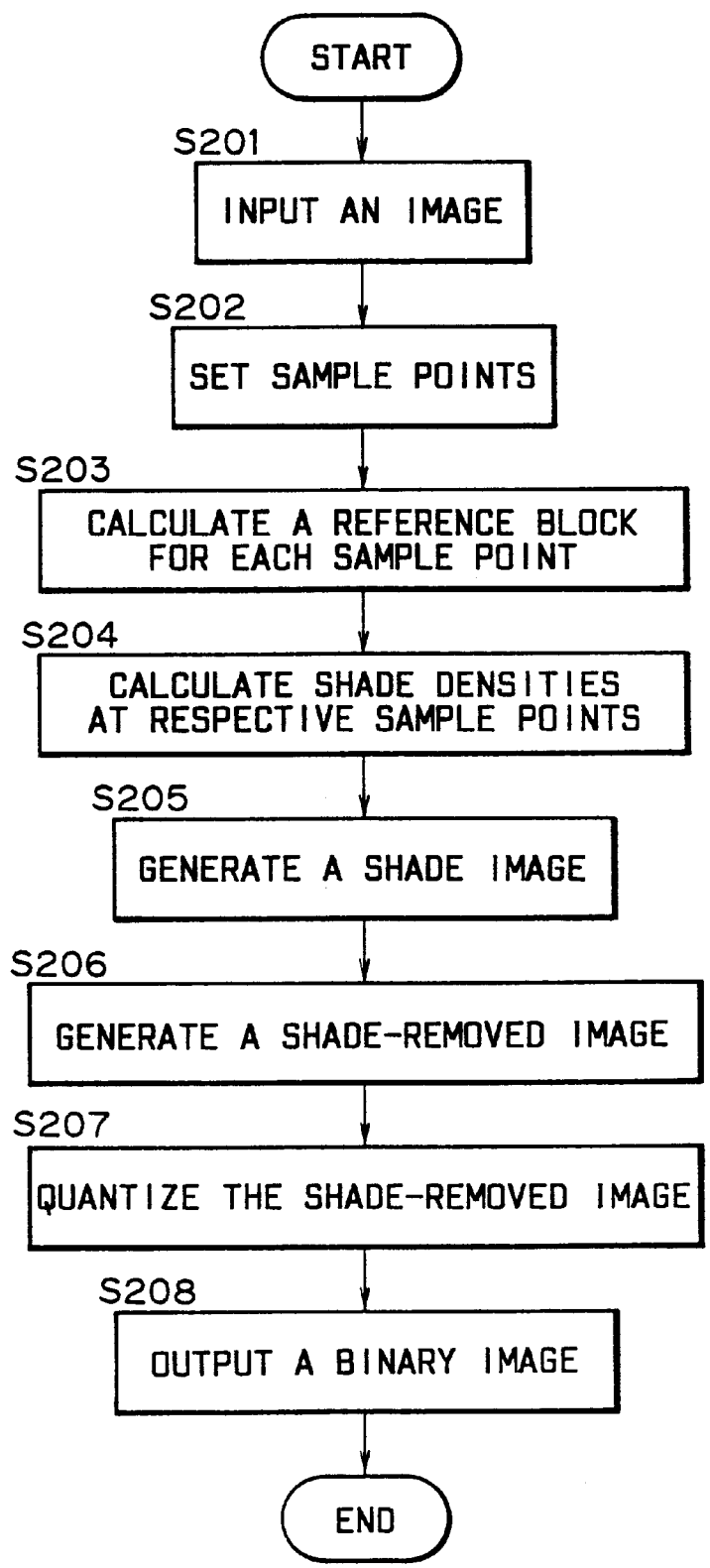
FIG. 7 is a flow chart for explaining operations of the second embodiment of the present invention.

Referring to a flow chart of FIG. 7, the operation of the above-mentioned binary image forming device (the second embodiment) will be described below. To clarify the explanation, the device is supposed to work with an input image where an optical density of a background (i.e., all the other portions except extractive objects) is larger (brighter) than an optical density of the objects to be extracted. A reverse case may be understood by reversing the density values of the object and the background.

An input image to be binarized is inputted through the image input portion 201 such as a charge-coupled camera (CCD) (Step S201). Like the sample-point setting portion 102 of the first embodiment, the sample point setting portion 202 sets sample point 30 at specified horizontal sx and vertical sy intervals (Step S202).

Figure 8:
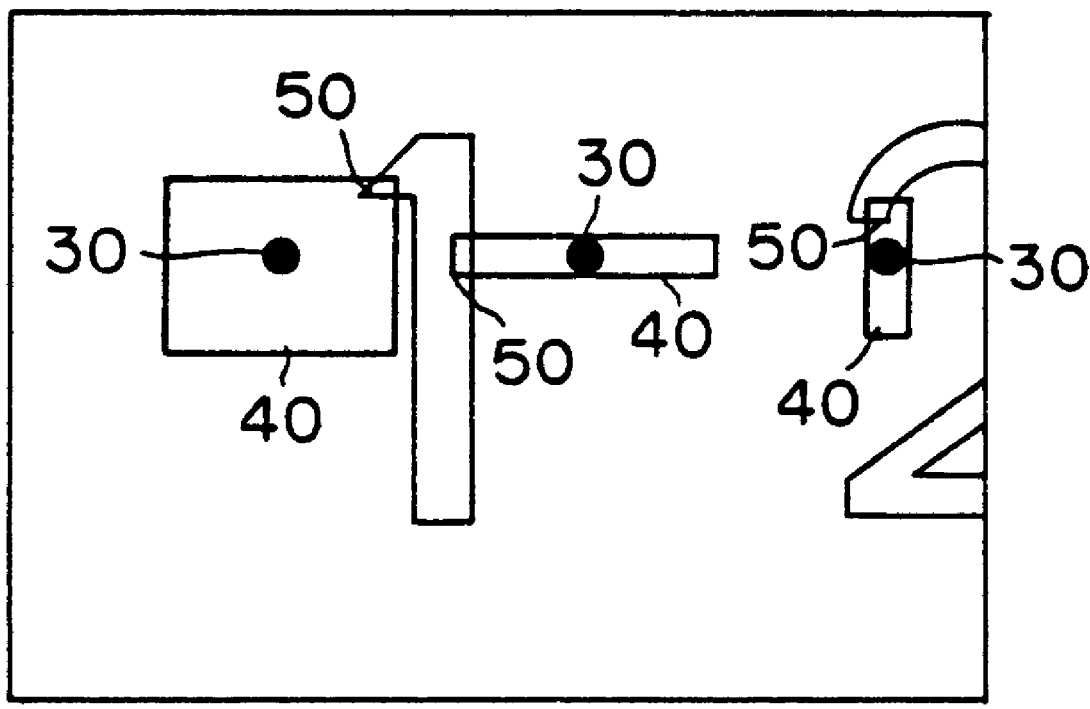
FIG. 8 shows an example of reference blocks set by one for each sample point in second and third embodiments of the present invention.

The reference-block calculating portion 204 determines an edge image from the input image by using a Sobel filter and extracts edges (boundaries between extractive objects and a background) by binarization. Using the obtained binarized edge image, the portion 204 searches an edge being nearest from each sample point 30 and sets a smallest possible rectangle including the sample point 30 at a center thereof and the found edge point, which is used as a reference block 40 for the sample point 30 (Step S203). Namely, since an image turns from a background to an object or from an object to a background at an edge point, the reference block obtained by the above-mentioned method always contains both a background area and an object area. In FIG. 8, a left-hand reference block 40 is a horizontally and vertically prolonged rectangle since its sample point has a nearest edge point in a diagonal direction. A center reference block is a horizontally prolonged rectangle since its sample point finds an edge point in the horizontal direction. A right-hand reference block is vertically prolonged rectangle since its sample point has an edge point in the vertical direction.

The sample-point shade calculating portion 203 determines an optical density of shading at each of sample points 30 according to the optical density distribution of input image pixels within each reference block, which was determined by the reference block calculating portion 204 (Step S204). The method of calculating the optical density of shading at a sample point 30 will not be further explained because it is the same as that described for the sample-point shade calculating portion 103 of the first embodiment, excepting the method of setting the reference blocks 40.

Like the shade calculating portion 104, the shade removing portion 105 and the binary-quantizing portion 106 of the first embodiment, the shade calculating portion 205 produces a shade image by determining optical densities of shading in the other areas except the sample point 30 by an interpolating method (Step S205), the shade removing portion 206 produces an shadeless image by eliminating the effect of the shading from the input image (Step S206), the quantizing portion 207 produces a binarized shadeless image (Step S207) and the image output portion 208 outputs the binary image (Step S208). The sequential image processing is now completed.

With an input image where extractive objects (e.g., characters and lines) can not correctly be recognized in advance, the binary-quantizing device of the first embodiment can not always assure that every reference rectangle contains background areas. On the contrary, the binary image forming device of the second embodiment can always assure that each reference block 40 for each sample point 30 contains a background area and, therefore, it can produce a more accurate shade image and a more desirable binary image as compared with the first embodiment. This second embodiment, however, is inferior to the first embodiment in that it requires more time for calculation and an additional memory used for calculation of the binarized edge-image by the reference block calculating portion 204. In other words, the first embodiment is preferable to use on the condition that objects to be extracted in an input image have known sizes.

Figure 9:
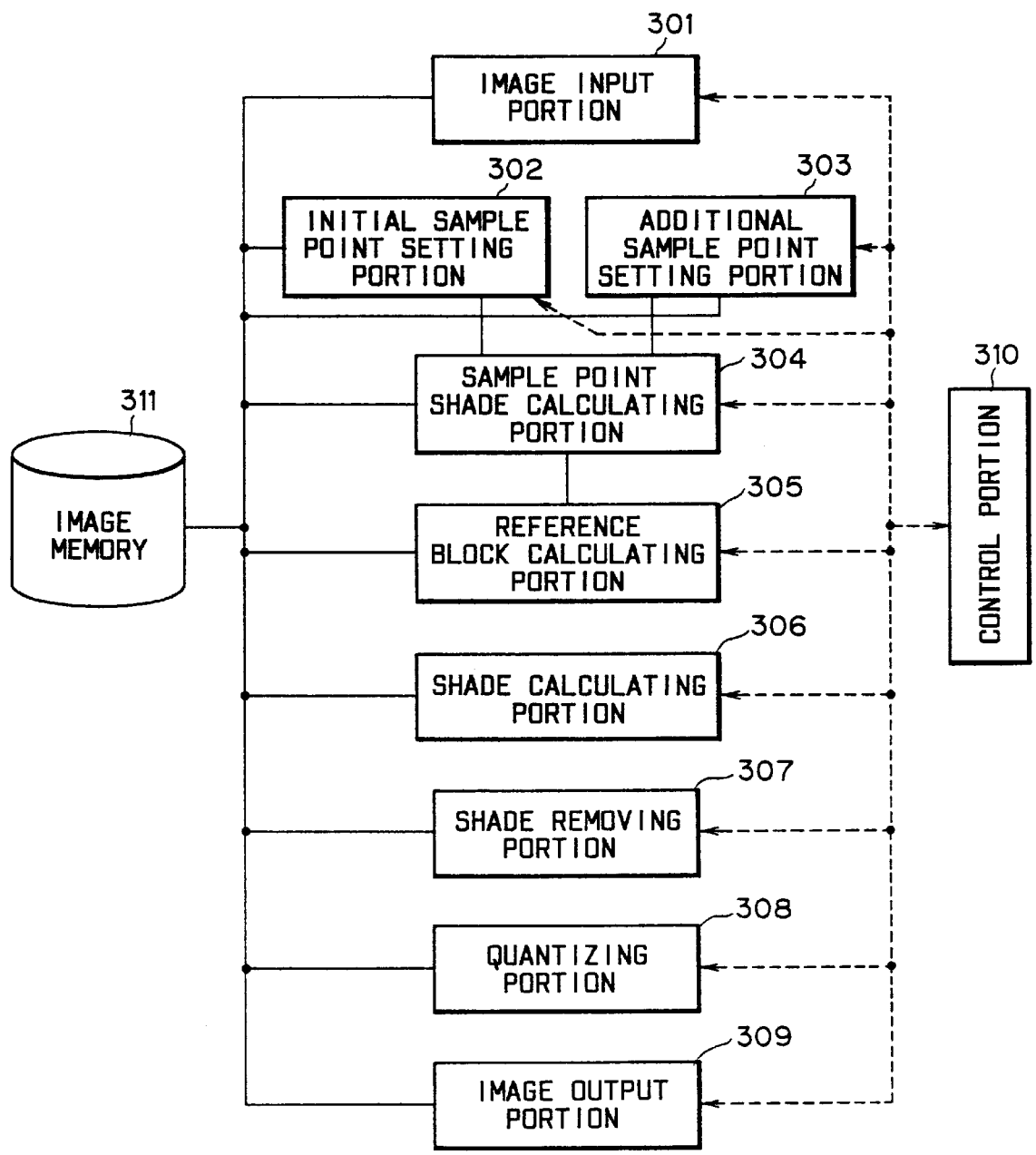
FIG. 9 is a block diagram showing a construction of a binary imageforming device which is the third embodiment of the present invention.

FIG. 9 is a block diagram of a binary image forming device according to a third embodiment of the present invention. In FIG. 9, the binary image forming device comprises: an image input portion 301 (e.g., a charge-coupled camera) for inputting an image to be converted into a binary image; an initial sample point setting portion 302 for setting initial sample points 30a one for a certain number of pixels composing the input image; an additional sample-point setting portion 303 for setting additional sample points 30b in accordance with shading of the input image, a reference block calculating portion 305 for setting reference blocks 40 adaptable for calculating shade at each of sample points 30a and 30b set by the initial sample-point setting portion 302 and the additional sample-point setting portion 303; a sample-point shade calculating portion 304 for determining an optical density of shading at each of the sample points set by the initial sample-point setting portion 302 and the additional sample-point setting portion 303 from a density distribution of pixels in each of the reference blocks set by the reference block calculating portion 305; a shade calculating portion 306 for generating a shade image by interpolating calculation of shade densities of the other pixels except the sample points on the basis of sample-point shading densities determined by the portions 301–305 for respective sample points; a shade removing portion 307 for generating a shadeless image by removing the effect of shading according to the shade image generated by the shade determining portion 306; a quantizing portion 308 for producing a set of binarized data representing the determined shadeless image produced by the shade removing portion 307; an image output portion 309 for displaying or printing the binary image obtained by the binary-quantizing portion 308; a control portion 310 for controlling the portions 301–309; and an image memory 311 for storing images generated by the respective processing portions.

Figure 10:
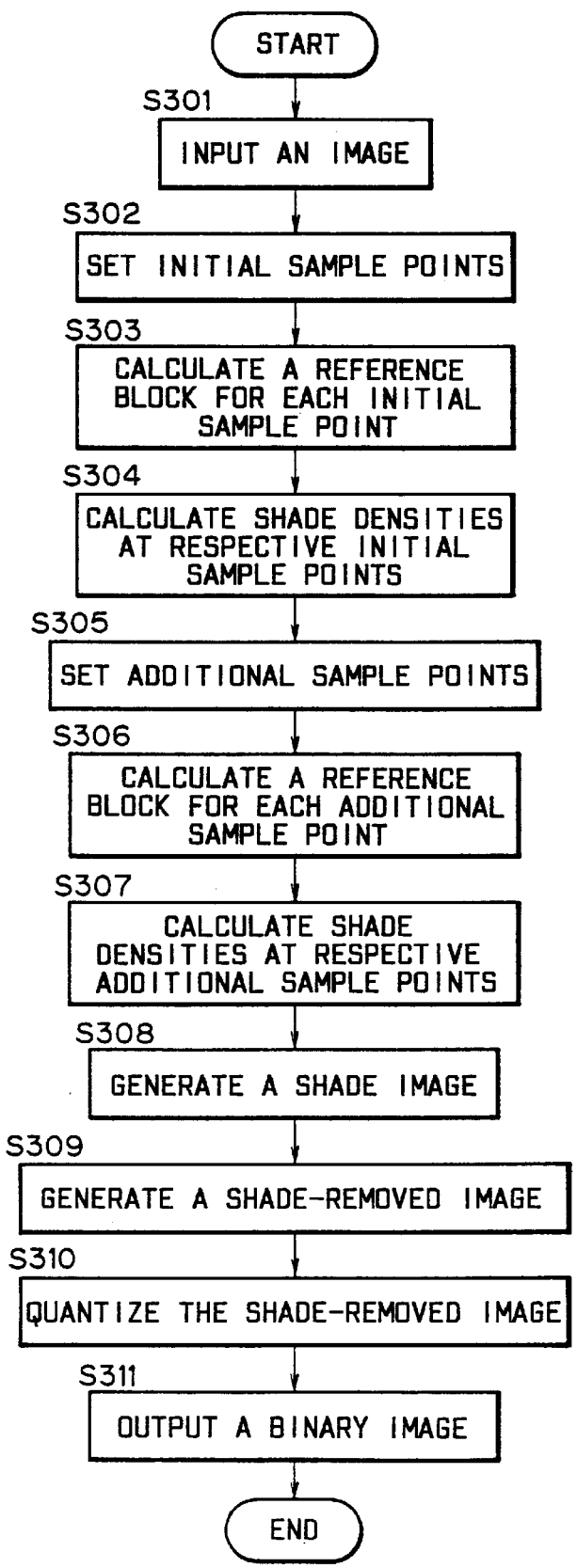
FIG. 10 is a flow chart for explaining operations of the third embodiment of the present invention.

Referring to a flow chart of FIG. 10, the operation of the above-mentioned binary image forming device (the third embodiment) will be described below. To clarify the explanation, the device is supposed to work with an input image where an optical density of a background (i.e., all other portions except extractive objects) is larger (brighter) than an optical density of the objects to be extracted. A reverse case may be understood by reversing the density values of the object and the background.

An input image to be binarized is inputted through the image input portion 301 such as a charge-coupled camera (CCD) (Step S301). Like the sample-point setting portion 102 of the first embodiment, the initial sample-point setting portion 302 sets initial sample points 30a at specified horizontal and vertical distances of sx and sy therebetween (Step S302). In the third embodiment, values of sx and sy are desirable to set in accordance with sizes of extractive objects in an input image. With an input image containing an object whose size can not accurately be defined, the parameters sx and sy may be set at values sufficiently larger than presumed values.

The sample-point shade calculating portion 304 and the reference-block calculating portion 305 set reference blocks by one for each of the initial sample point 30a (Step S303) and determine an optical density value of shading for each initial sample point 30a by calculating optical densities of pixels within each reference block (Step S304). The processing operations of the sample-point shade calculating portion 304 and the reference-block calculating portion 305 are the same as those described for the sample-point shade calculating portion 203 and the reference-block calculating portion 204 of the second embodiment.

The additional sample point setting portion 303 compares optical densities of shading at 4 neighbors of the initial sample points 30a, determines the number of additional sample points from differences of the shade densities between the initial sample points and sets the necessary number of additional sample points 30b (Step S305).

Figure 11:
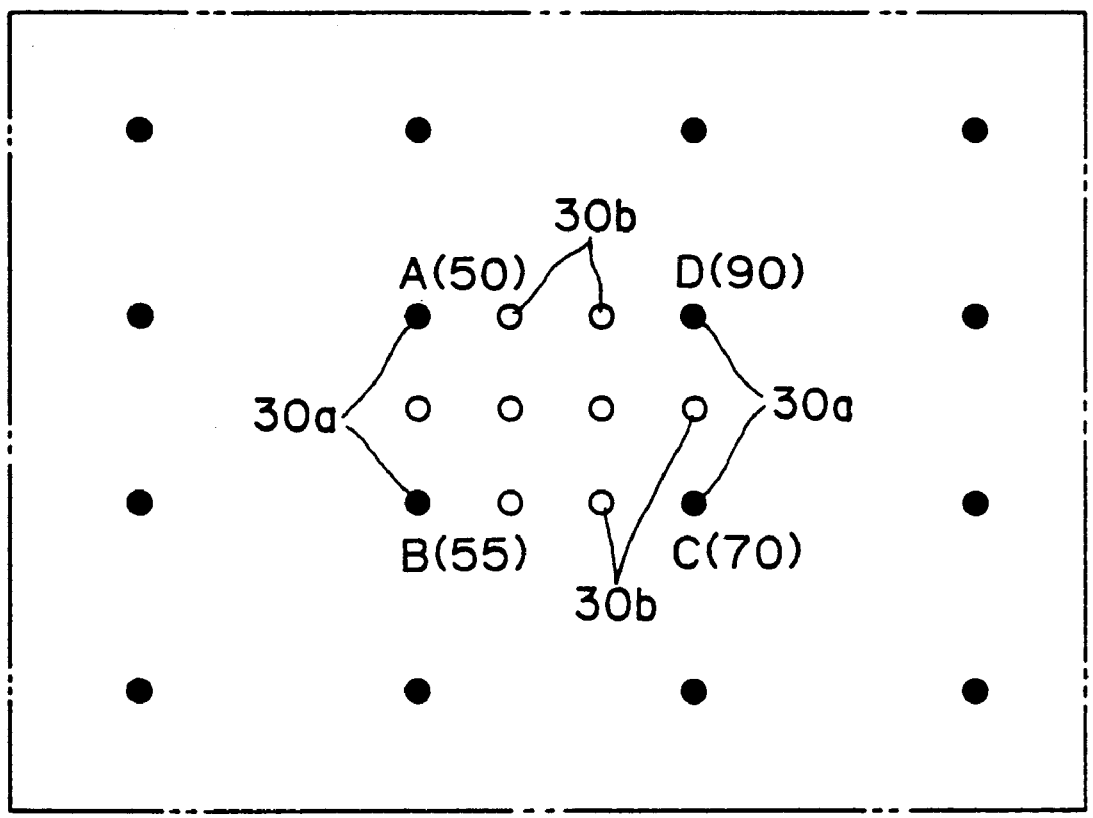
FIG. 11 shows initial sample points and additional sample points in the third embodiment of the present invention.

Referring to FIG. 11, 4 neighboring initial sample-points A, B, C and D are supposed to have optical densities I(A), I(B), I(C) and I(D) respectively. It is also assumed that a rectangle ABCD currently does not contains any other sample points than the above-denoted initial sample points.

$$Dx = INT(\text{Max}(|I(A) - I(D)|, |I(B) - I(C)|) / \text{BASE}) + 1 \quad (4)$$

$$Dy = INT(\text{Max}(|I(A) - I(B)|, |I(D) - I(C)|) / \text{BASE}) + 1 \quad (5)$$

According to the above-mentioned equations, values Dx and Dy are determined and the rectangle ABCD is divided horizontally by Dx and vertically by Dy into Dx×Dy divisions (small rectangles). Additional sample points 30b are set one at each of vertices except vertices A, B, C and D. Max (x, y) represents a larger one of the values x and y, INT(i) is an integer with a cut-off fraction and BASE is a constant for controlling the number of sample points to be added. Supposing that, for example, points A, B, C and D (FIG. 11) are initial sample points, I(A)=50, I(B)=55, I(C)=70, I(D)=90 and BASE=20, the following calculations are conducted:

$$\begin{aligned} Dx &= INT(\text{MAX}(40, 20)/20) + 1 \\ &= INT(40/20) + 1 = 3 \end{aligned} \quad (6)$$

$$\begin{aligned} Dy &= INT(\text{MAX}(5, 20)/20) + 1 \\ &= INT(20/20) + 1 = 2 \end{aligned} \quad (7)$$

Now, Dx=3 and Dy=2 are obtained. And therefore $$(3+1)\times(2+1)-4=12-4=8 \quad (8)$$

are abtained.

Consequently, 8 additional sample points 30b are set at places indicated with white circles in FIG. 11.

The above-mentioned operations are performed on every pairs of two neighbored points of 4 initial sample points for setting additional sample points. The sample-point shade calculating portion 304 and the reference block calculating portion 305 then set reference blocks for respective additional sample points 30b (Step S306), calculate a histogram of optical densities of pixels within each reference block and determine the optical density of shading at each additional sample point (Step S307). These processing steps are similar to the processing steps for determining shading at the initial sample points 30a, which in turn are similar to the processing steps described for the sample-point shade calculating portion 203 and the reference block calculating portion 204 of the second embodiment.

Like the shade calculating portion 104, the shade removing portion 105, the binary-quantizing portion 105 in the first embodiment, the shade calculating portion 306 produces a shade image by interpolating calculation of optical densities of shading in areas except the sample points (Step S308), the shade removing portion 307 produces a shadeless image by removing the effect of shading from the input image (Step S309), the quantizing portion 308 produces a binary image by binarizing the shadeless image (Step S310) and the image output portion 309 outputs the binary image (S311), by which the sequential operation of the device is completed.

Accordingly, as distinct from the first and second embodiments, the binary image forming device according to the third embodiment can produce a shade image by adding any number of necessary sample points in accordance with shading condition of an input image and more accurately determine shading on the input image. Even in the case if sample points must be set at large intervals because objects to be extracted from an input image can not be measured, this embodiment can accurately determine a shade image by additionally setting necessary sample points, finally generating a more adequately binalized image.

An binary image forming device mention in the first embodiment is designed to set sample points one for a certain number of pixels within an input image, set sample blocks of a specified size, each including one of the sample points at its center, determine optical density of shading at each sample point from a density distribution of pixels in the other areas except the sample points by calculating a distribution of pixels in the reference block, produce a shade image by calculating shading in the other areas except the sample points by interpolating method, produce a shadeless image by eliminating the shading effect from the input image by using the shade image and binalize the shadeless image. Therefore, this device can produce a high-quality binary image from an input image containing self-shaded objects (e.g., characters and lines) or vaguely contoured and distinctly contoured objects by eliminating the shading effect without erasing self-shaded objects and by surely extracting vaguely contoured objects.

A binary image forming device mentioned in the second embodiment is further provided with a reference block calculating portion for setting reference blocks which are best suited in size and shape to respective sample points. With an input image where extractive objects (e.g., characters and lines) can not be measured in size, the binary image forming device according to the first embodiment can not always assure that every reference rectangle contains background areas. On the contrary, the binary image forming device according to the second embodiment can always assure that each reference block for each sample point contains a background area and, therefore, it can produce a more accurate shade image and a more desirable binary image.

The binary image forming device mentioned in the third embodiment can produce a shade image by adding any number of necessary sample points in accordance with shading of an input image, which is measured at initial sample points, and more accurately determine shading on the input image than the devices mentioned in the first and second embodiment. Even in the case if sample points must be set at large intervals because objects to be extracted from an input image can not be measured in size, this embodiment can accurately calculate a shade image by additionally setting necessary sample points and finally generate a more desirable binary image.

We claim:

1. A binary image forming device comprising:

an image input portion for inputting an image to be converted into a binary image;

a sample point setting portion for setting sample points for a certain number of pixels composing the input image;

a sample-point shade calculating portion for setting a reference block of specified size for each sample point located at a center thereof and determining an optical density of shading at the sample point from an optical density distribution of pixels in the reference block;

a shade calculating portion for generating a shading image by interpolating a calculation of optical density of shading at the other pixels except the sample points according to sample-point shading densities determined at respective sample points;

a shade removing portion for generating a shadeless image by removing a shading effect according to the shade image generated by the shade calculating portion;

a quantizing portion for producing a binary image of the determined shadeless image; and an image outputting portion for displaying or printing the binary image.

2. A binary imageforming device comprising:

an image input portion for inputting an image to be converted into a binary image;

a sample point setting portion for setting sample points for a certain number of pixels composing the input image;

a reference block calculating portion for setting reference blocks for each sample point, each reference block being adaptable for determining an optical density of shading at each sample point;

a sample-point shade calculating portion for calculating a shade density for each sample point set by the sample point setting portion according to an optical density distribution of pixels in each reference block set by the reference block calculating portion;

a shade calculating portion for generating a shading image by interpolating a calculation of optical density of shading at the other pixels except the sample points according to sample-point shading densities determined at respective sample points;

a shade removing portion for generating a shadeless image by removing a shading effect according to the shading image generated by the shade determining portion;

a quantizing portion for producing a binary image of the determined shadeless image; and an image outputting portion for displaying or printing the binary image.

3. A binary imageforming device comprising:

an image input portion for inputting an image to be converted into a binary image;

an initial sample-point setting portion for setting initial sample points for a certain number of pixels composing the input image;

an additional sample-point setting portion for setting a necessary number of additional sample points according to shading levels at initial sample points set by the initial sample-point setting portion;

a reference block calculating portion for setting reference blocks for each initial sample point set by the initial sample-point setting portion and each additional sample point set by the additional sample-point setting portion, said reference blocks being adaptable for calculating shade densities at respective initial and additional sample points;

a sample-point shade calculating portion for calculating shade densities for each initial sample point and each additional sample point set by the initial sample-point setting portion and additional sample point setting portion respectively according to density distributions of pixels in the respective reference blocks set by the reference block calculating portion;

a shade calculating portion for generating a shading image by interpolating a calculation of optical density of shading at the other pixels except the sample points according to sample-point shading densities determined at respective sample points;

a shade removing portion for generating a shadeless image by removing a shading effect according to the shading image generated by the shade determining portion;

a quantizing portion for producing a binary image of the determined shadeless image; and an image outputting portion for displaying or printing the binary image.

* * * * *